United States Patent
Spiro et al.

(10) Patent No.: US 10,813,478 B2
(45) Date of Patent: Oct. 27, 2020

(54) SYSTEM FOR RETAINING AN IMAGE WITHIN A FRAME

(71) Applicant: Tracer Imaging LLC, Ossining, NY (US)

(72) Inventors: Steven M. Spiro, Chappaqua, NY (US); Stephen S. Daniell, Lenox, MA (US); Kevin Skeuse, White Plains, NY (US); Paul Dowd, White Plains, NY (US)

(73) Assignee: TRACER IMAGING LLC, Ossining, NY (US)

( * ) Notice: Subject to any disclaimer, the term of this patent is extended or adjusted under 35 U.S.C. 154(b) by 27 days.

(21) Appl. No.: 15/849,418

(22) Filed: Dec. 20, 2017

(65) Prior Publication Data

US 2018/0199736 A1   Jul. 19, 2018

Related U.S. Application Data

(60) Provisional application No. 62/436,958, filed on Dec. 20, 2016.

(51) Int. Cl.
*A47G 1/10*   (2006.01)
*G09F 7/18*   (2006.01)
(Continued)

(52) U.S. Cl.
CPC ............ *A47G 1/10* (2013.01); *A47G 1/0605* (2013.01); *F16B 4/004* (2013.01); *G09F 7/18* (2013.01);
(Continued)

(58) Field of Classification Search
CPC ...... A47G 1/10; A47G 1/0605; A47G 1/0611; A47G 2001/0677; G09F 15/0012; G09F 15/0018
See application file for complete search history.

(56) References Cited

U.S. PATENT DOCUMENTS 2,155,729 A   4/1939   Mainieri
3,294,429 A   12/1966  Halp
(Continued)

FOREIGN PATENT DOCUMENTS

EP   1149550        10/2001
GB   1 334 851      10/1973
WO   WO 2012/076370  6/2012

OTHER PUBLICATIONS

"5 x 7 Double Picture Frame for Tabletop, Slide in Rear Backer—Silver" (DISPLAYSZGO) Nov. 17, 2015 (Nov. 17, 2015); retrieved from internet Jun. 4, 2018; <https://web.archive.org/web/20151117081709/https://www.displays2go.com/P-12957/Metal-Picture-Frame-Displays-Two-5-x-7-Prints>; entire document.

*Primary Examiner* — Gary C Hoge
(74) *Attorney, Agent, or Firm* — Leason Ellis LLP

(57) ABSTRACT

A spline installation device for use with a spline/rail type frame to assemble the splines to the rails. The device including a base that defines a platform for receiving a frame subassembly; and a plurality of linkages that are disposed about the platform and coupled to the base. Each linkage is configured to move between a first position in which a fence bearing surface thereof is at an angle other than 90 degrees relative to the platform and a second position in which the fence bearing surface is set at an at least substantially 90 degree angle relative to the platform for locking and holding the frame subassembly in place. The linkages further being configured to receive a spline instillation tool for locking the splines in place relative to the rails.

24 Claims, 8 Drawing Sheets

(51) Int. Cl.
  *G09F 15/00* (2006.01)
  *A47G 1/06* (2006.01)
  *F16B 4/00* (2006.01)
  *B44D 3/18* (2006.01)

(52) U.S. Cl.
  CPC ...... *G09F 15/0012* (2013.01); *G09F 15/0018* (2013.01); *A47G 2001/0677* (2013.01); *B44D 3/185* (2013.01)

(56) References Cited

U.S. PATENT DOCUMENTS

| | | |
|---|---|---|
| 3,429,602 A | 2/1969 | Dirilgen |
| 3,657,796 A | 4/1972 | Gochnauer |
| 4,018,260 A | 4/1977 | Baslow |
| 4,041,861 A | 8/1977 | Alter |
| 4,144,660 A | 3/1979 | Lamb |
| 4,197,686 A | 4/1980 | Baslow |
| 4,637,147 A | 1/1987 | Wolsey |
| 5,058,353 A * | 10/1991 | Gartner ............... A47G 1/06 52/28 |
| 5,275,224 A | 1/1994 | Morris |
| 5,307,575 A | 5/1994 | Ivansson et al. |
| 5,466,086 A | 11/1995 | Goto |
| 5,502,906 A | 4/1996 | Yamawaki |
| 5,579,595 A | 12/1996 | Dutton |
| 6,138,741 A | 10/2000 | Stobart |
| 6,189,252 B1 * | 2/2001 | Dowzall ............... A47G 1/10 40/783 |
| 6,253,471 B1 | 7/2001 | Strauh |
| 6,722,096 B2 | 4/2004 | Von Arx |
| 6,729,057 B1 | 5/2004 | Lu |
| 7,735,541 B2 | 6/2010 | Ocampo |
| 8,793,910 B2 | 8/2014 | Froio |
| 8,936,065 B1 | 1/2015 | Gillespie |
| 9,402,488 B2 | 8/2016 | Morrish |
| 2001/0014250 A1 | 8/2001 | Plummer et al. |
| 2003/0200712 A1 | 10/2003 | Brownsell et al. |
| 2005/0129460 A1 * | 6/2005 | Medcalf ............... E06B 3/5454 403/403 |
| 2007/0245650 A1 | 10/2007 | Brown |
| 2009/0031593 A1 | 2/2009 | Kasuya |
| 2010/0147471 A1 | 6/2010 | Bull |
| 2012/0090211 A1 * | 4/2012 | Price ............... A47G 1/06 40/711 |
| 2013/0180142 A1 * | 7/2013 | Kressin ............... A47G 1/06 40/792 |
| 2014/0352184 A1 | 12/2014 | Hall |
| 2015/0297001 A1 | 10/2015 | Welch |
| 2016/0296033 A1 | 10/2016 | Feltrin |

* cited by examiner

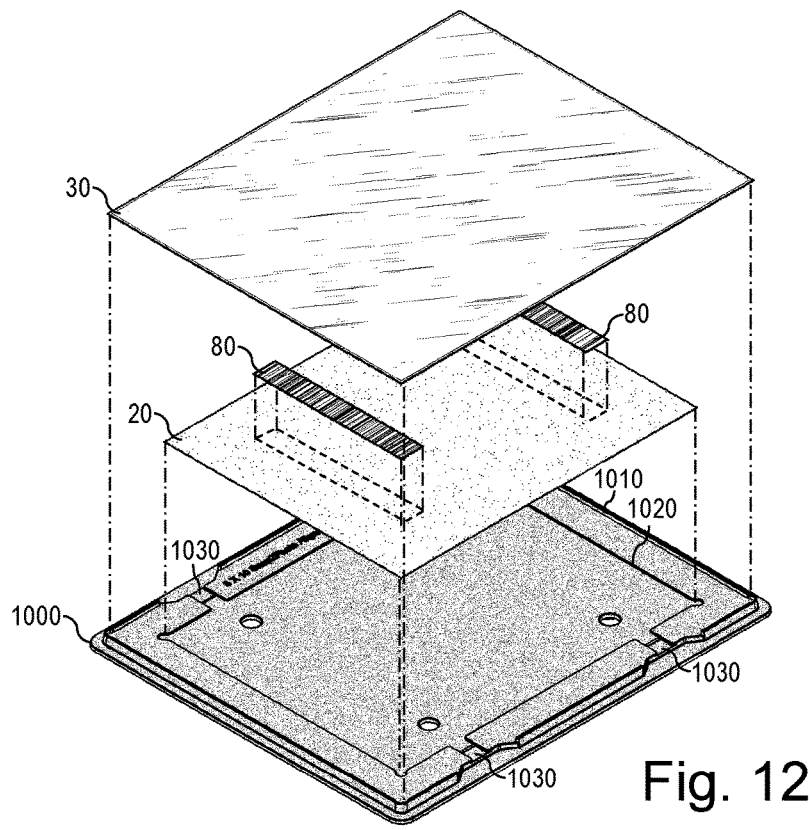
Fig. 12
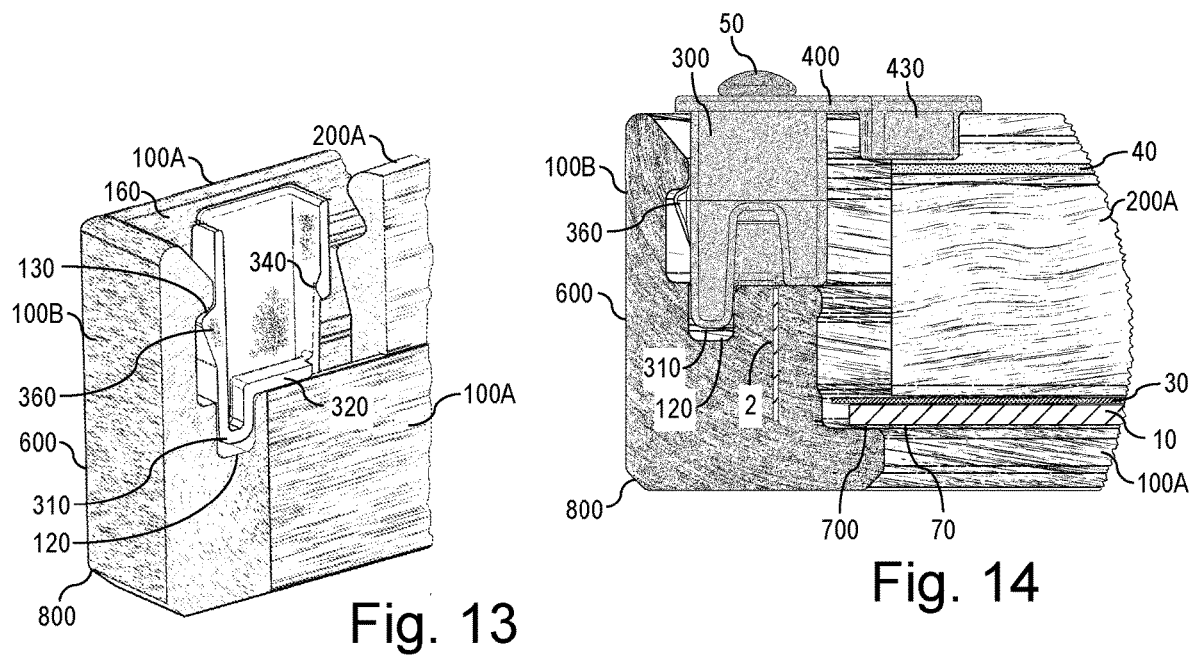
Fig. 13
Fig. 14

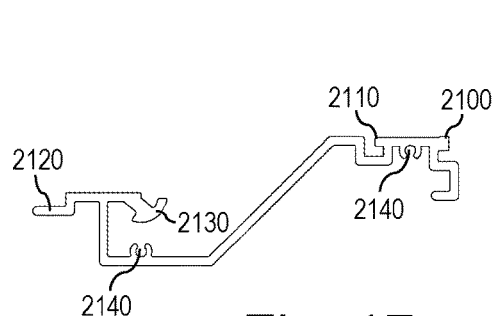
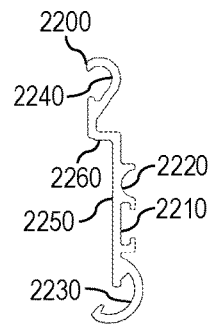
Fig. 17
Fig. 18
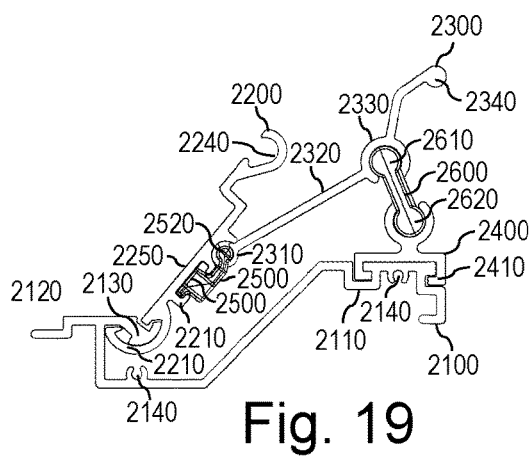
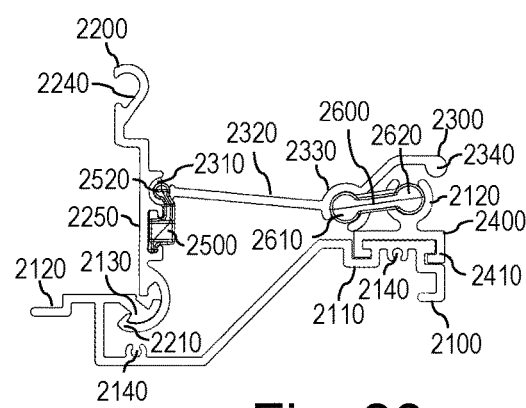
Fig. 19
Fig. 20
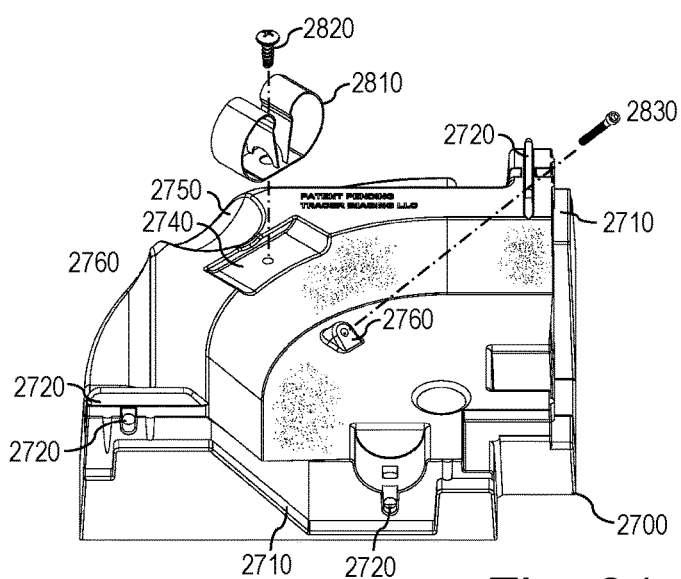
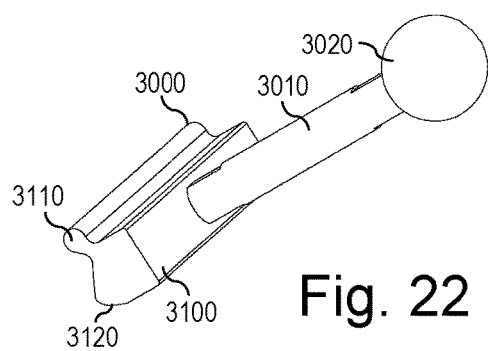
Fig. 21
Fig. 22

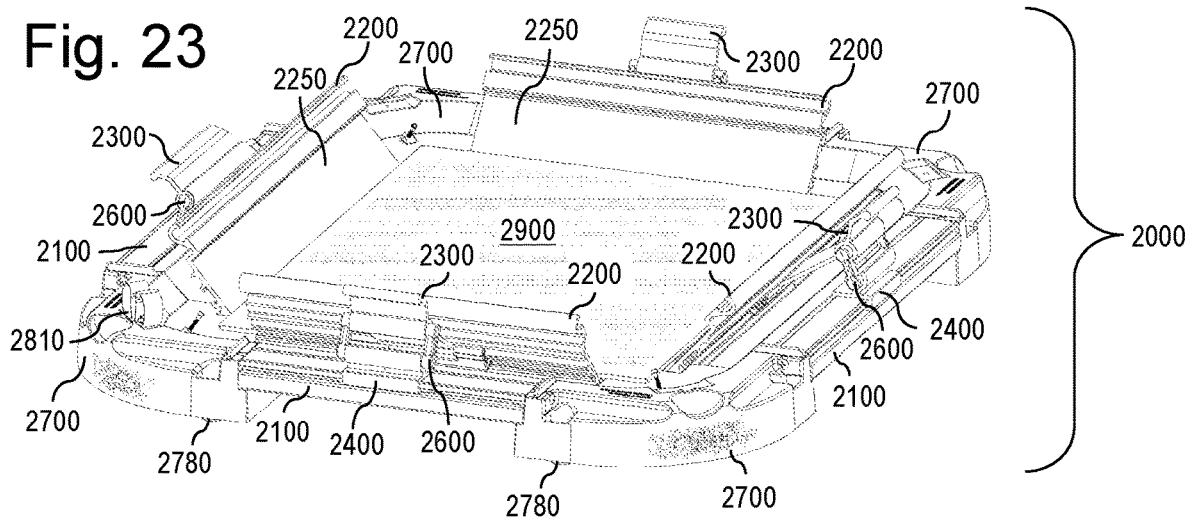
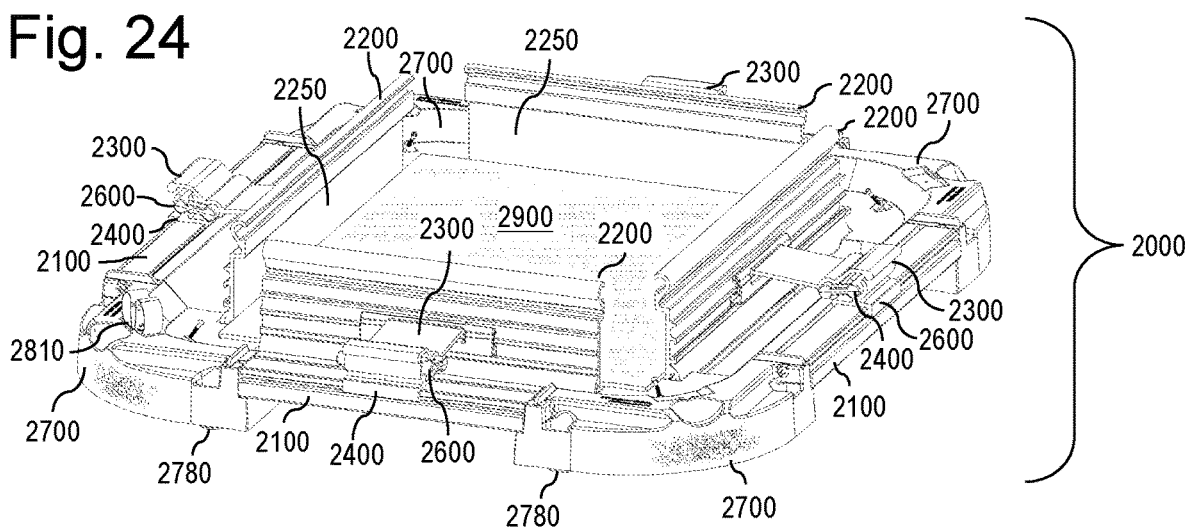
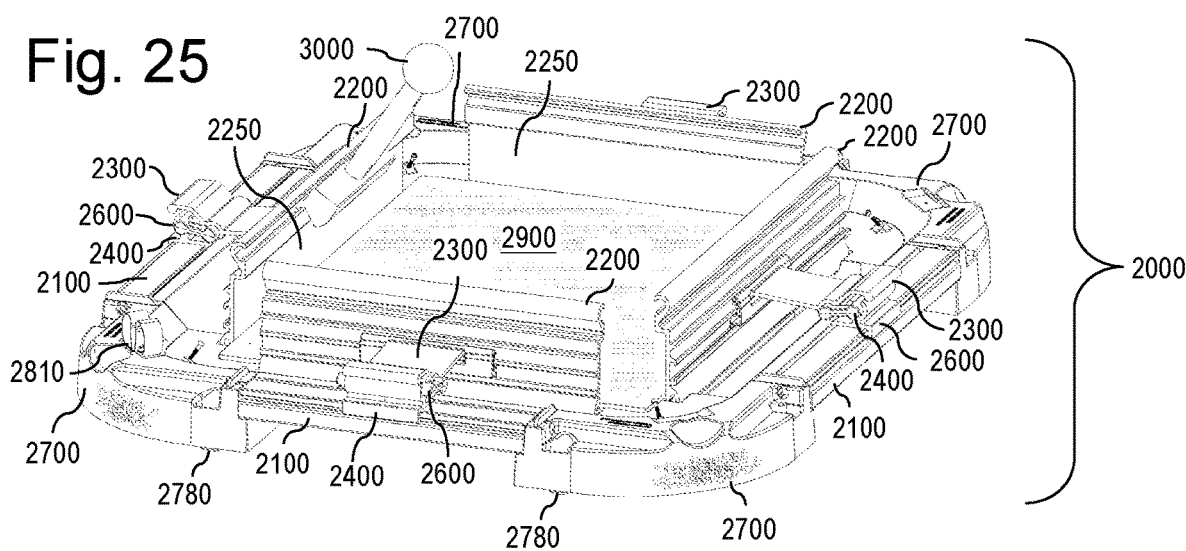

SYSTEM FOR RETAINING AN IMAGE WITHIN A FRAME

CROSS-REFERENCE TO RELATED APPLICATION

This application claims priority to U.S. Ser. No. 62/436,958, filed Dec. 20, 2016 and is related to U.S. Ser. No. 62/231,969, filed Jul. 21, 2015, U.S. Ser. No. 62/335,751, filed May 13, 2016 and U.S. Ser. No. 15/265,417, filed Sep. 14, 2016, each of which is incorporated by reference as if expressly set forth in their respective entirety herein.

BACKGROUND

The idea of entrapping a flat item between two sheets of transparent material is likely nearly as old as the invention of sheet glass. The present invention describes novel structures that allow a printed image, in particular, to be readily located and held between two transparent sheets that are, in turn, held within a frame.

In a conventional construction, the pressure between two sheets of glass pinches the image in position, and the paired sheets of glass are then fixed within, for example, a rabbet in the back of a wooden picture frame. The image then appears to float ahead against any ambient background, often with the open glass surrounding area serving cosmetically in place of an opaque picture mat.

This configuration produces a pleasing appearance, but poses a number of challenges. First, glass sheet dangerous to handle, and is subject to impact or breakage from impact or from a fall. Second, an image with a transparent surround allows the inside of the frame to be seen, which places constraints on how the frames can be attractively assembled and finished. Third, it is difficult to secure the paired sheets reliably to one another, given seasonal fluctuations in common dimensional materials such as wood moldings.

SUMMARY

The present invention therefore proposes a number of novelties. The entrapping sheets may electively be composed of molded plastic, and can therefore include functional components. Among these functional components are a recessed tray to locate and retain an image of a specific dimension, an opening through which at least one finger may be inserted to lift the image out of the recessed tray, and an integrated tension system that maintains tension between two transparent sheets so that they cannot separate or loosen.

Such functional features as alignment trays or finger holes may be located on one of the sheets, while the other may be a simple flat sheet. The functional components may also electively be divided between the two sheets. Alternatively, as will be shown, some functions may electively be integrated into external fixtures, and the entrapping sheets made of simple cut sheet stock of clear glass or polymer.

A sheet carrying functional components may be injection-molded with a clear polymer material, such as acrylic or styrene. Various combinations of materials may be selected for rigidity, durability, clarity, UV-resistance, reflectivity, texture, birefringence, manufacturability, scratch resistance, or other quality may be elected according to knowledge available to those practiced in the art.

Alternately, the exposed surface may, for example, be made of glass, and the glass pre-attached to the frame, so that the sharp edges of the glass are sheltered by the frame rails. In this embodiment, secondary assembly can be accomplished with minimal risk of injury. Because of the relative rigidity of glass, the transparent backer, amenably made of clear plastic sheet, can be reduced in thickness.

The reduced thickness makes the plastic sheet relatively compliant, and it has been found that this modification can be usefully and economically substituted for the molded component carrying the recessed tray, as describe above. Provisions disclosed in this specification enable the precise alignment of a printed image with the frame.

External Alignment Fixture

In this modification, an external alignment fixture can be used that has the same ability to place the image at a predetermined location relative to the frame ass the recessed tray previously described.

When a molded external alignment fixture is used, the cost of the molded alignment component can be distributed over a large number of frames. The external fixture typically has some features that the recessed, transparent display panel would have, but can have additional functional features as well.

For example, in common with the variation in which the alignment feature is integrated into the final frame assembly, the external alignment fixture can usefully include a recessed tray having the dimensions of an anticipated printed item, and can have finger holes open through the fixture so that the printed item can be readily lifted from the recess.

The alignment fixture can include a second larger tray whose perimeter is sized to contain the transparent backer sheet. Also, the external alignment fixture need not be made of transparent material, and can carry instructions, marks, and other indicia intended to facilitate assembly and minimize error. The assembler need not be concerned, in this case, with leaving fingerprints on a clear sheet during the final assembly of the frame.

Snap Fittings

The frame subassembly within the invention also includes novel features. Namely, the frame subassembly essentially includes two frame structures, the first of which is preassembled. The preassembled frame is provided with a relief profile such that an intermediate snap fitting array can be affixed to it. This snap fitting array may amenably be injection molded. The snap fitting can be linear, or can be integrated into functional molded corner inserts.

Hidden Fasteners

The frame described within the invention has the advantage that it may be assembled using fasteners that are hidden once the frame system is fully assembled, so that there are no visible nails, brads, or other fasteners. V-nails, staples, corrugated fasteners, or plastic "bow-ties" may be usefully employed for such purposes within the invention.

A novel and advantageous property of the invention is that the staples, fasteners, or V-nails can be located on a land devised between the back plane and the front plane of the frame, and hidden after final assembly. Furthermore, this location has been found to be the optimal position for keeping a miter closed, as fastening from the front is unattractive, while fastening from the back permits the most visible face of the miter to open and leave a perceptible gap.

The snap fitting array includes attachment features that engage both with the preassembled frame and the secondary frame elements. In an exemplary embodiment, the snap fittings are devised to engage with each rail of the preassembled frame such that the insertion is primary and relatively resistant to withdrawal.

The snap pins or caps associated with the secondary frame provide secure and unambiguous positioning and assembly, but are intentionally more reversible. In this way, the secondary frame elements can be inserted and removed at will, while the plastic snap fitting arrays tend to remain in place upon the preassembled frame.

The snap fitting arrays may be designed as a modular component, so that a number of the components may be aligned within a single length of rail or molding. In this way, larger dimensions of frame may be accommodated without the cost of fabricating a large mold for each situation.

Layered Mounting System

The secondary frame includes a number of discrete components. In a rectangular application of the invention, four linear splines are dimensionally matched to four plastic corner parts. The components are devised so that the corner parts and the splines all snap into place, and meet in a reliable, continuous, and visually pleasing way.

These components also include a setback or rabbet so that a planar backer board may held at a remove to create a shadowbox effect. The backer board need not be opaque, but may be opaque, transparent, translucent, a combination thereof, or patterned in any imaginable way.

The assembly process may be summarized as follows. Four pieces of molding having engageable surface features, typically grooves, are mitered and fastened into a rectangle. The frame is provided as a kit including the remaining components to a second assembly location. A sheet of transparent material may electively be preinstalled in the frame at this stage.

Optionally and conveniently, the frame may be provided as a kit including the remaining components to a second assembly location. In the invention, the secondary assembly typically needs no mechanical joinery aside from that intrinsic to the design of the wood moldings and snap fittings. No adhesive is required, except when tape is used to fix the photo to the transparent backing sheet. The frame is completed through a series of simple operations.

Print Alignment, 1$^{st}$ Embodiment

In a first embodiment, the preassembled frame is laid upon a flat surface. A printed image of predetermined sized is placed with the shallow recessed tray in the injection-molded sheet. The second sheet is placed on top of the sheet carrying the printed image making an aligned paring of the two sheets. The sheets are flipped and placed in the frame.

Print Alignment, 2nd Embodiment

In a second embodiment, the preassembled frame is again laid upon a flat surface, but in this embodiment one transparent sheet is preinstalled in the frame. A printed image of predetermined sized is placed with the shallow recessed tray in the external alignment fixture. Adhesive, typically in the form of one or more strips of two-sided adhesive tape, is applied to the back of the printed image. The clear backing sheet is then placed on top of the printed image and within the second and larger recessed tray. This subassembly is then removed from the fixture and placed in the frame.

Assembly Overview

As in prior versions of the invention, splines and frames made according the invention may be rapidly and successfully assembled by an inexpert operator through the use of an assembly aide in the form of a fixture having hinged fences. Preferably, the fences are devised with a centerless hinge, so that the center of rotation of the fences does not jam against the edges of the frame as the fences are closed. A detailed embodiment of such a fixture is described later in this specification.

Irrespective of the embodiment, four initial snap fitting components are inserted into the frame, and snapped firmly into place. The splines are reversibly snapped or pressed into the frame.

Secondary snap components are the installed at the corners to further secure the rails. The splines then bear against the mated clear sheets, entrapping the printed item and pressing the stack of sheet materials against the frame. This procedure provides a safe, clean, and secure process that yields an attractive graphic arts product that can be assembled by an unpracticed assembler in a minimum amount of time.

A plain or patterned backer board may be electively attached to the provided recesses, or the image may be left open to its ambient background, such as a wall or other existing partition. The backer board may be devised to be reversible, with differing colors, finishes, patterns, or imagery upon its opposite faces. The backer board may be prepared with texturing or coating, for example, to receive a particular ink or additional lamination.

The frame may be stood on its own or upon a stand, or provided with hardware to be placed upon a wall. The frame or rail may be amenably devised with grooves or channels to compatibly attach a hook or hanger. The features of the invention may be variously integrated, and may be implemented through a diversity of processes and materials.

BRIEF DESCRIPTION OF THE DRAWING FIGURES

The present invention may be appreciated by reference to the following descriptions and drawings, in which.

Figure 1:
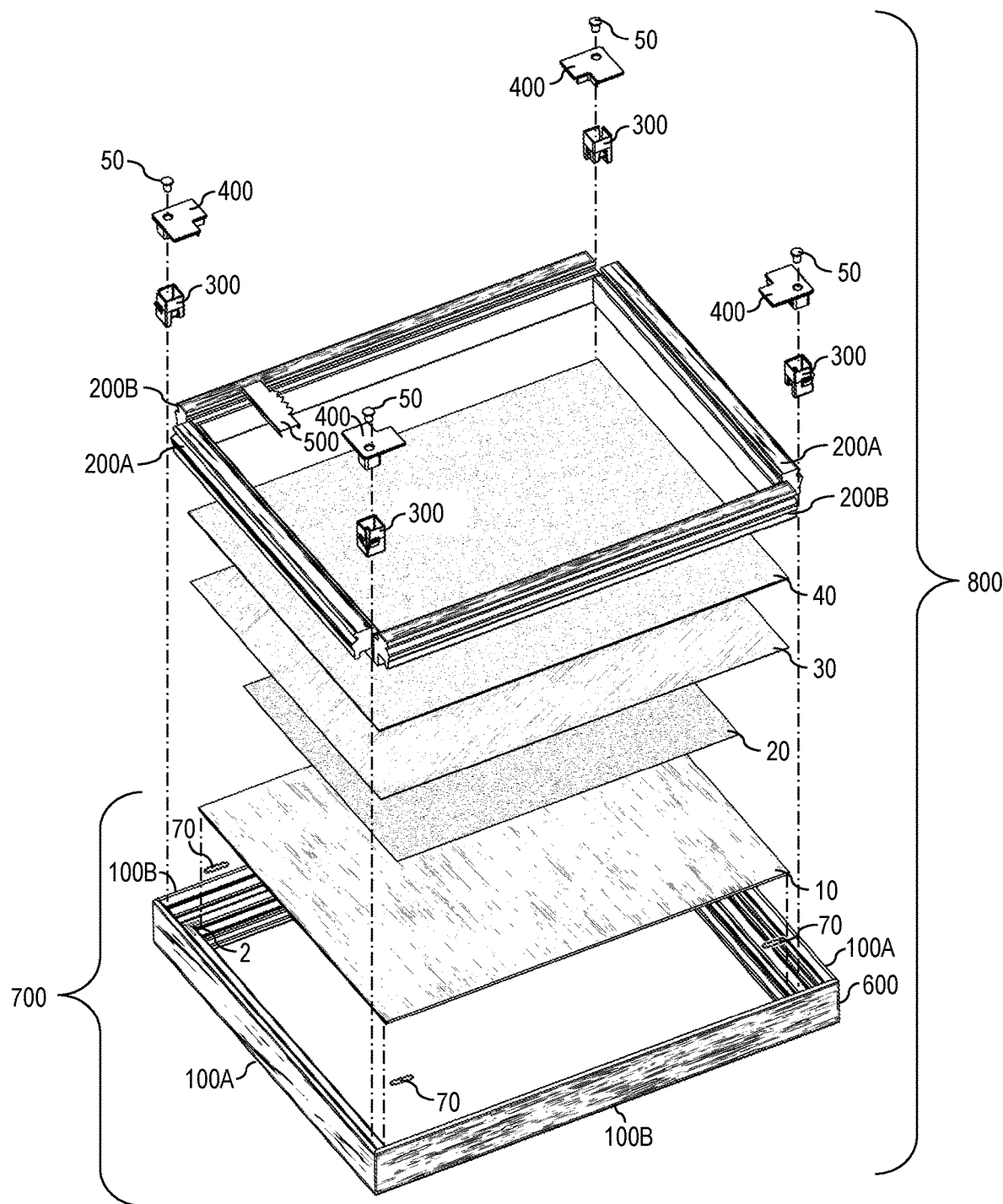
FIG. 1 is an exploded view of the major elements of the print frame.
Figure 3:
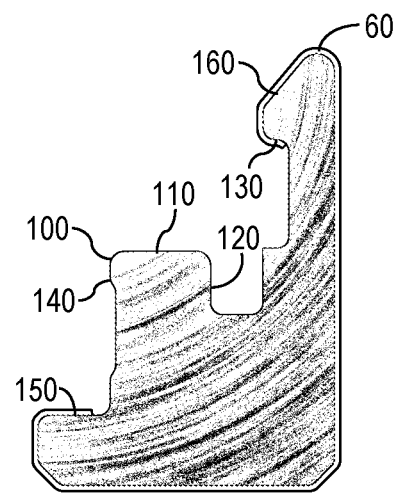
Figure 4:
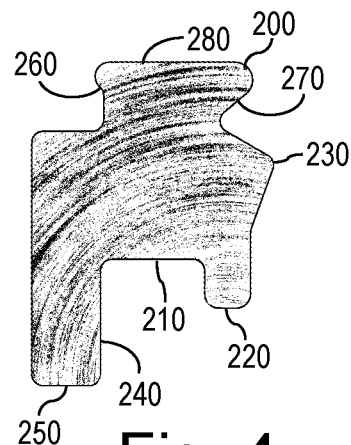
Figure 5:
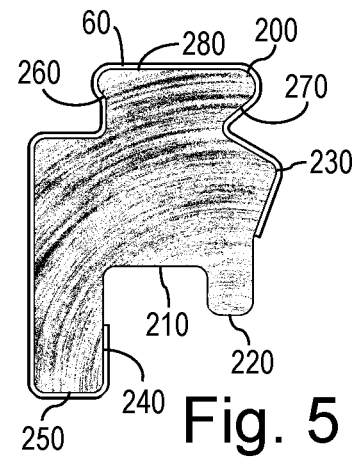
Figure 6:
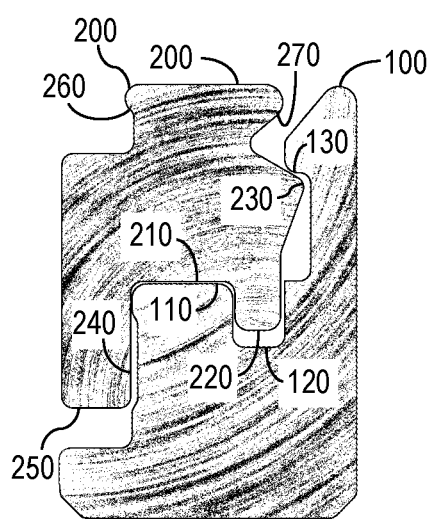
Figure 7:
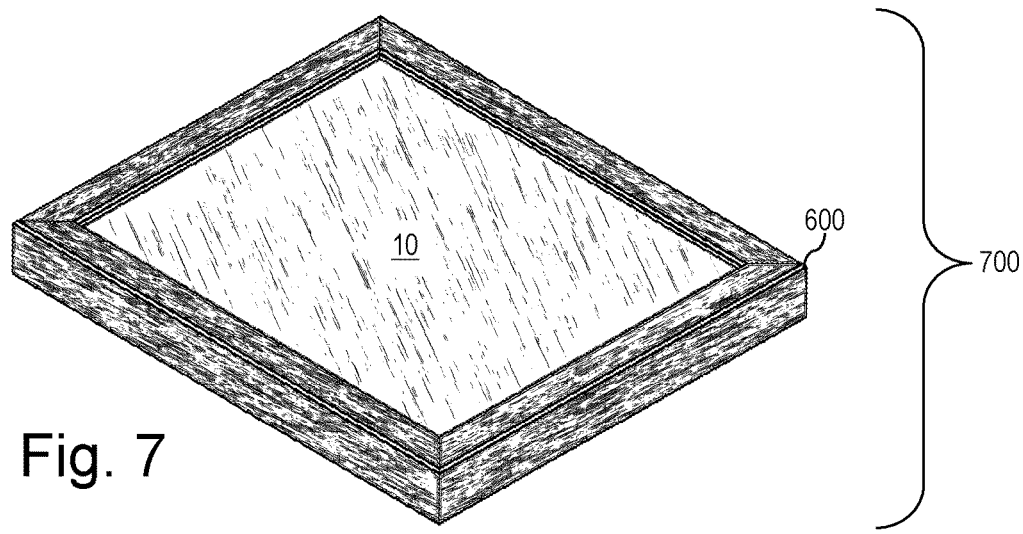
Figure 8:
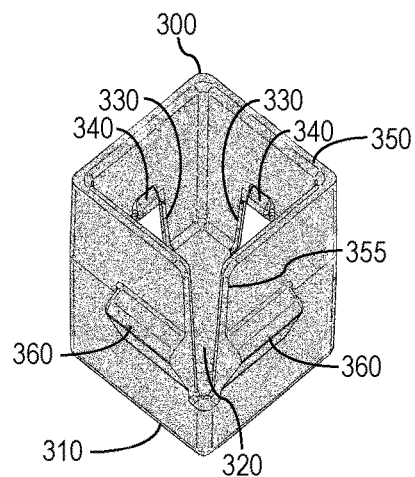
Figure 9:
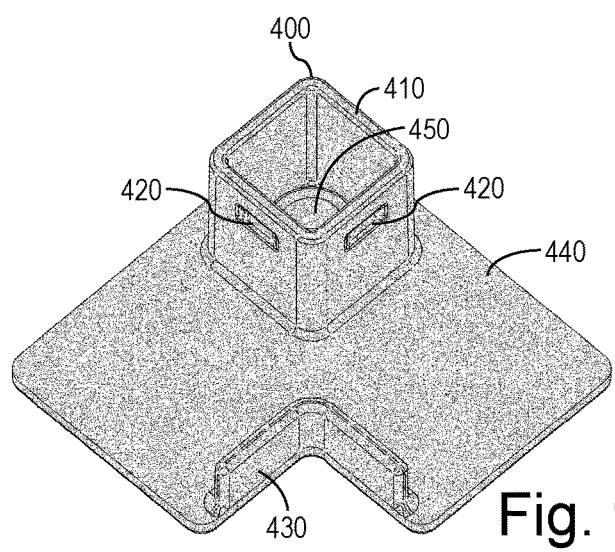
Figure 10:
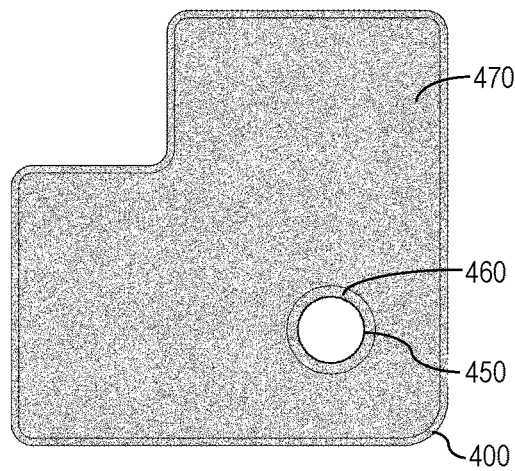
Figure 11:
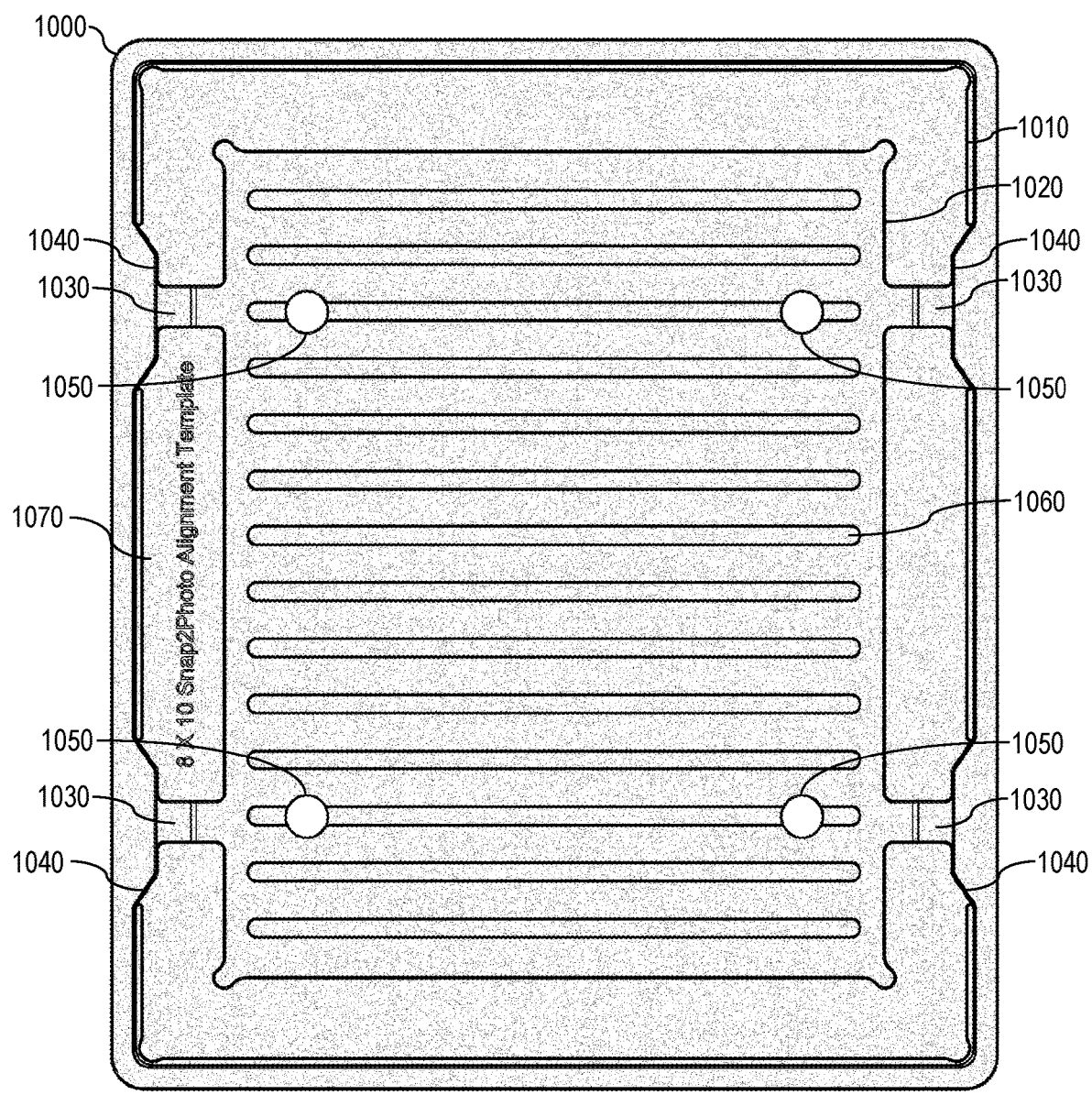
Figure 15:
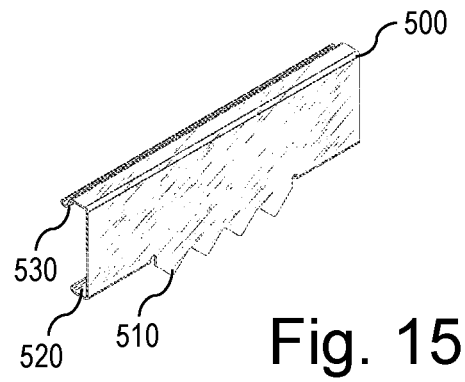
Figure 16:
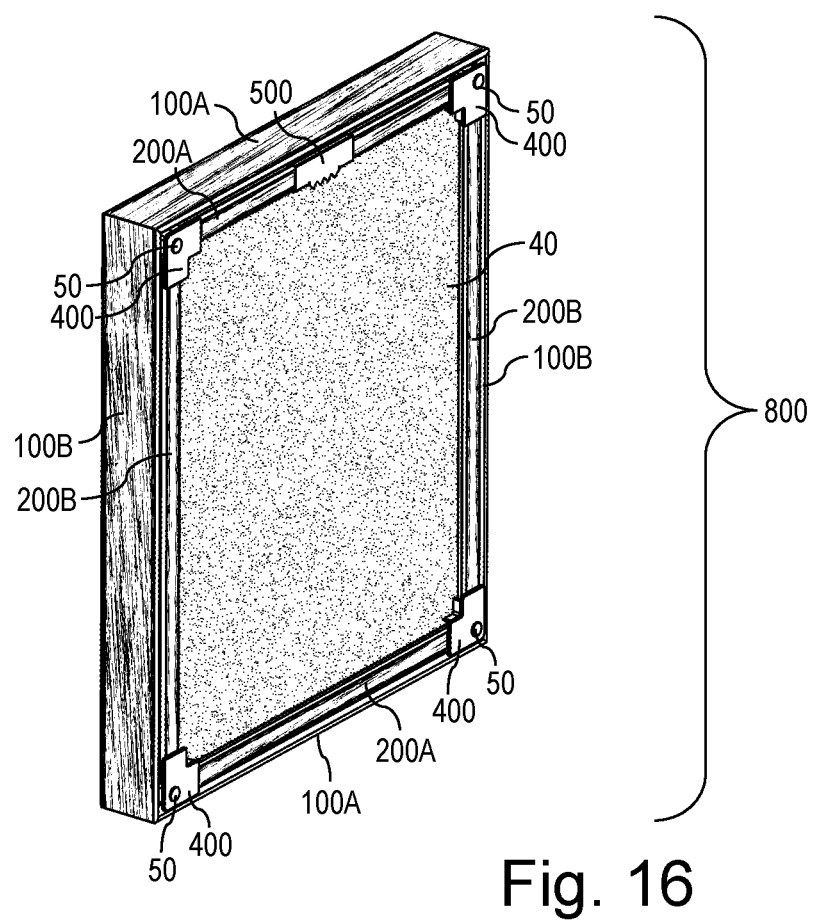

FIG. 3 is a sectional view of the frame profile with a conformal finish layer over part of its surface, FIG. 4 is a sectional view of the spline profile, FIG. 5 is a sectional view of the spline profile, with a conformal finish layer over part of its surface, FIG. 6 is a schematic sectional view of the spline and rail profile, illustrating their complementary interfitting structures, FIG. 7 is a schematic perspective view of a subassembly comprising a joined, mitered frame with a glass sheet preinstalled, FIG. 8 is an oblique perspective view of the hollow molded corner insert, showing the open end of the insert, showing beveled tabs for snap fitting the insert to the frame, and the corner cap to the insert, FIG. 9 is a bottom view of the corner cap, facing the inside of the "L", and showing the two rectangular detents that connect with the corresponding tabs on the corner inserts shown in FIG. 8, FIG. 10 is a top view of the corner cap, showing the beveled hole for the resilient bumper, FIG. 11 is a plan view of the print alignment fixture, corresponding to the size of the frame and print illustrated in exemplary FIG. 1, FIG. 12 is an exploded perspective view of the alignment fixture showing the fixture, the photo, two strips of tape, and a clear backing sheet, located in their relative positions for merging into a subassembly, FIG. 13 is a cutaway perspective view of a corner of the assembled frame, showing the structural features of the corner insert that engage both the frame and the corner cap, FIG. 14 is a cutaway elevation view, showing a corner cap in place, and identifying the internal, concealed location of a V-nail, FIG. 15 is an illustration of a metal hanger used compatibly in conjunction with the invention, FIG. 16 is a rear perspective view of the assembled shadowbox frame, including an opaque backer board, and showing the final position of the elements floating photo frame, FIG. 17 is a sectional view of the aluminum base extrusion used in the illustrated variation of the assembly fixture, FIG. 18 is a sectional view of aluminum fence extrusion used in illustrated variation of the assembly fixture, FIG. 19 is a detailed schematic end view of a locking linkage mechanism, in its lowered position, FIG. 20 is a detailed schematic end view of a locking linkage mechanism, in its raised position, FIG. 21 shows a descriptive perspective view of a molded fixture corner block, showing tool holder a material positioning screw exploded to a location beyond the corner block, FIG. 22 is a detailed perspective view of a spline insertion tool alone, showing the sectional profile of the tool head extrusion, FIG. 23 is a perspective view of the working assembly fixture, fences lowered, FIG. 24 is a perspective view the working assembly fixture, fences raised, and FIG. 25 shows the working assembled fixture, fences up, with the tool in place at a raised angle.

DETAILED DESCRIPTION OF CERTAIN EMBODIMENTS

Figure 2:
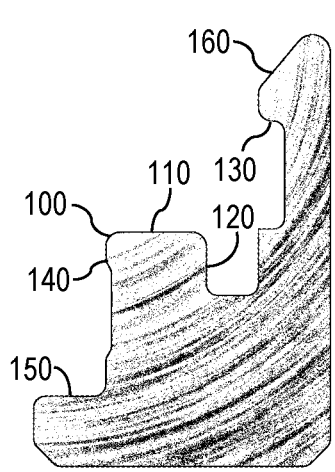
FIG. 2 is a sectional view of the frame profile.

FIG. 1 is an exploded view of complete print frame assembly 800. Print frame assembly 800 is safely and usefully provided with the mitered rails already joined into a frame, and the glass already installed in the assembled frame. FIG. 1 shows preassembled mitered frame 600. Preassembled mitered frame 600 is made using four mitered sections of frame stock 100 having the profile illustrated in FIGS. 2 and 3. The rail sections are represented in the illustrated exemplary rectangular frame by short mitered rails 100A and long mitered rails 100B.

Mitered corners are joined here using V-nails. V-nails are right-angled connectors typically made of fine-gauge, hardened steel, and are used in the framing trade to securely join frame parts, ideally without splitting the frame stock.

However, it may be appreciated that the typical location of a V-nail, upon the flat back face of the frame, is not available in the wood molding design shown. Instead, in the invention, V-nail 2 is installed into expressly and conscientiously devised land 110, as may be more fully appreciated by reference to FIG. 14.

Returning to FIG. 1, typically glass sheet 10 is adhered to the preassembled frame using beads of adhesive 70, and this subassembly is provided as a component in a boxed frame assembly kit. When the picture mounting process is completed, as may be appreciated most simply by reference to FIG.1 and FIG. 16, the box may be reused as a presentation box for the completed, enclosed photo or art display.

In the picture mounting process, the mitered frame, with glass preinstalled, is inverted on a flat surface. Using the print alignment fixture depicted in FIGS. 11 and 12, exemplary print 20 is then attached to one side of clear plastic support sheet 30. The stack of planar materials set into the frame. In FIG. 1, mat board backer panel 40, four short splines 200A, four long splines 200B, four hollow corner inserts 300, four corner caps 400, four bumper pads 50, and metal hanger 500, are substantially shown in positions relative to their ultimate order and mode of insertion.

Spline installation fixture 2000, illustrated in FIGS. 17 through 25 inclusive, may amenably and advantageously be employed with either the print mounting system described in this application, or may equally and interchangeably be used in the fabric mounting system described in pending U.S. application Ser. No. 15/265,417, which is hereby incorporated by reference in its entirety.

In the present embodiment, corner inserts 300 snap into pre-assembled frame 600, splines 200 are inserted along the four sides of the frame 600, between corner inserts 300, so as to ultimately bear against a stack composed of glass sheet 10, photograph 20, and clear plastic support sheet 30.

Mat board backer panel 40 is set into compatible recess in spline stock 200, and corner caps 400 are snapped into corner inserts 300 to secure and retain the entire set of materials. Four bumper pads 50 are typically composed of resilient material, such as an elastomer. Metal hanger 500, illustrated in detail in FIG. 15, is secured into compatible grooves expressly incorporated in the profile of spline stock 100.

Further features and operations may be appreciated by reference to more detailed features of the invention. FIGS. 2 through 6 inclusive illustrate operational and cosmetic features of the milled wood components. Frame rail parts 100A and 100B are mitered lengths cut from rail stock 100, as typified by the profile shown in FIG. 2 and FIG. 3. Frame spline parts 200A and 200B are mitered lengths cut from rail stock 200, as typified by the profile shown in FIG. 4 and FIG. 5. FIG. 6 shows the spline and rail profile mechanically joined, illustrating their complementary, interfitting structures.

FIG. 3 is a sectional view of the profile of frame rail stock 100, with a conformal finish layer 60 over part of its surface, while FIG. 5 shows a similar surface treatment applied to frame spline stock 200. This surface treatment may be a wrap or film composed of polymer, foil, paper, composite, or other suitable material. It may be attached to the milled wood core material by heat, adhesive, or both. It may be of any color, pattern, or aspect, and may be variously treated, textured, molded, or embossed to simulate natural materials.

It may be appreciated that the selective application of the conformal layer permits a picture frame, assembled from a spline and rail as in FIG. 6, to exhibit a consistent finish once the splines and rails are joined, as no unfinished wood surfaces are exposed to the visible interior faces of the frame assembly.

Referring now to the relief features of frame rail stock 100, flat rail stock land is devised to receive one or more V-nails using an automated stapling device. A V-nailer usually holds a frame down against a table and staples the V-nails in place. In the present invention, the anvil of an automated V-nailer can be adjusted so that it is raised above the table to approximately half the height of the wood rail, so that the anvil bears on the land at the time the joint is secured by the V-nails. In this manner, a V-nail joint can be made that is wholly concealed once the frame is assembled. This gives the frame a finished appearance when mounted on a stand, or in any other situation where the back is exposed to view.

Relief features of rail stock 100 further include dado 120, retainer lip 130, compression ridge 140, and retaining rabbet 150. By reference to FIGS. 4 through 6 inclusive, compatible features may be found on frame spline stock 200, including spline stop land 210, spline guide ridge 220, spline engagement ridge 230, spline compression face 240, spline stack retention face 250, spline backer retention lip 260, and angled spline lifting face 270.

It may be appreciated by particular reference to FIG. 6 that the relief features of the lightly engaged parts acts as a guide, so that the application of mechanical force to spline top face 280 of spline stock 200, when rail stock 100 is securely held and stationary, induces guided mechanical engagement between the compatible features of the rail and the spline.

FIG. 7 through 15 inclusive show details of parts and subassemblies that relate to the operation of the system of the invention. FIG. 7 shows preassembled mitered frame 600, with glass sheet 10 secured with adhesive, to form frame prefabricated subassembly 700.

FIG. 8 is an oblique perspective view of hollow molded corner insert 300. L-shaped connection ridge 310, understood more completely by concurrent reference to FIGS. 13 and 14, fits into short sections of the grooves at each interior location where the milled wooden frame parts meet at a miter. When tilted in toward the interior of its associated mitered joint, corner insert 300 snaps into place under a geometrically compatible rim, conscientiously milled into the inside of the wooden frame profile.

Corner insert 300 therefore includes two pairs of tapered snap hooks that promote, first, the joining of the corner insert to the frame, and then, second and later in the assembly process, the joining of the corner caps to the corner inserts. The initial insertion end of corner insert 300 includes L-shaped connection ridge 310, corner insert stop face 320, and sliding core aperture 330. Corner insert stop face 320 ensures that the corner cap will be seated at a height flush with the back of the wooden frame, and places partial rim 350 substantially flush with the back of the frame. Sliding core aperture 330 permits the efficient molding of internal snap fitting (locking tabs) 340, shown in FIG. 5.

FIG. 8 shows that the open end of corner insert 300 is delimited by partial rim 350. The rim is said to be partial because the perimeter does not describe a complete square, but is interrupted by a deep notch defined by valley rim 355. The notch defined by valley rim 355 permits the polymer partition wall to deflect, and allows spring force to hold the corner insert in place at two locations positioned at 90° to one another. This action may be appreciated by reference to the cutaway view shown in FIG. 13.

The larger external, raised, oppositely-beveled tabs 360 are designed to have the injection mold parting line at their common apices. This arrangement allows the mold halves to be parted, and a dual-ramped snap tab to be formed without undercuts. Two smaller, internal beveled snap tabs 340, used for fastening the corner cap to the installed corner inserts, are shown formed at the top of sliding core aperture 330.

FIG. 9 illustrates the underside of exemplary corner cap 400. Hollow rectangular stub 410 is devised to fit into partial rim 350 of corner insert 300, and carries recessed detents 420 dimensioned to receive internal snap fitting 340 formed on corner insert 300. L-shaped retention wall 430 is scaled to entrap mat backer board 40 once the kit is fully assembled. Internal cap face 440 overlaps spline stock 200 during the kit's final assembly. Cap through-hole 450 is shown in FIG. 9 and FIG. 10. FIG. 10 is a top view of the corner cap, showing cap through-hole 450 devised to receive resilient bumper 50. The hole is surrounded by hole bevel 460, and the bevel by external cap face 470.

Both corner inserts 300 and corner caps 400 may be amenably fabricated from injection—molded polymer, including but not limited to high-impact polystyrene (HIPS), nylon, and acrylonitrile butadiene styrene (ABS). Polymers may be variously pigmented, modified, or reinforced with additives, as is well understood in the trade. The materials for the corner insert and the corner cap may be the same, similar, or different.

FIG. 11 is a plan view of print alignment fixture 1000, substantially corresponding to the size of the frame and print illustrated in exemplary FIG. 1. An alignment fixture such as the exemplary design shown in FIG. 11 may be implemented in various embodiments and with diverse modifications, so that a range of sizes and layouts can be provided by a user or vendor.

Specific features of print alignment fixture 1000 include outer tray 1010, inner tray 1020, tape locators 1030, finger indents 1040, finger holes 1050, raised release ribs 1060, and instructional indicia panel 1070.

Instructional indicia panel 1070 can identify requisite the print and frame, and may electively include further guidance on the use and handling of the associated materials. An exemplary use of print alignment fixture 1000 is illustrated in the exploded view shown in FIG. 12. Print 20 is locates such that its edges abut the substantially commensurate perimeter of inner tray 1020. The radiused and set-back corners of the perimeter prevent bending or fraying of the corners of the print. Two-sided tape strips are applied in visual alignment with tape locators 1030.

Outer tray 1010 is devised to be substantially commensurate with clear plastic support sheet 30. Clear plastic support sheet 30 is placed within the bounds of outer tray 110 and in the desired positional relationship relative to the print. Clear plastic support sheet 30 is then pressed into secure contact with two-sided tape strips 80 such that print 20 and clear plastic support sheet 30 are mutually adhered.

Tape may be taken from a spool, but may more conveniently be provided in precut strips, provided with release liner on two sides, and provided with tabs or slits to aid in its application, as is well understood and appreciated in the general practice of tape adhesion. Liquid, gelatin, or semisolid, or aerosol adhesive may be substituted for the tape herein described, without departing from the spirit of the invention.

Once the subassembly composed of the printed material, the adhesive, and the clear backer sheet 30 is laminated into a stack, that stack of materials is removed from the alignment fixture. Finger indents 1040, release holes 1050, and raised release ribs 1060 provide means to lift the stack of materials with minimal resistance. The holes and ribs allow airflow under the print, subverting vacuum adhesion, while finger indents 1040 allow the laminated stack to be lifted without touching any surface that is visible in the assembled product. It may be appreciated that the inclusion of dust and fingerprints generally requires remediation, which greatly lengthens the requisite assembly cycle.

For example, the tray or trays receiving the print or prints may provide margins may that in width or proportion, are skewed relative to the frame, accommodate multiple prints, accommodate prints of differing sizes or orientations, are arranged in a regular or irregular mosaic, or are of freeform or arbitrary shape. In general, the fixture should be understood to retain a print, in any embodiment thereof, in desired position relative to the shape of the associated geometrical frame.

FIG. 13 and FIG. 14 show details that reveal the inner structure of the frame at two stages of the assembly process. In FIG. 13, The view is cut away through the middle of a mitered corner of the frame, and through the middle of corner insert 300. Preassembled frame 600, joined with glass into frame prefabricated subassembly 700, had been fitted with corner insert 300 and short rail 200A. It may be seen that corner insert 300 fits into dado 120 in the frame rail via L-shaped connection ridge 310.

As the corner piece is installed, oppositely-beveled tabs 360 are deflected by, and then bypass, retainer lip 130, effectively in the manner of a snap fitting. Corner insert stop face 320 arrests the insertion at the proper depth. Four corner inserts 300 are thereby secured in each of the four corners of the exemplary frame.

FIG. 14. Shows a partial cutaway of the assembled frame. The view is cut away at the limit of the corner insert, and therefore includes a complete elevation view of the corner insert shown in FIG. 8. The sequence of assembly may be appreciated by concurrent reference to the exploded perspective views of FIG. 1 and FIG. 12.

The preassembled frame 600 has been provided within frame prefabricated subassembly 700, in which the glass and frame have been preadhered using adhesive 70. The stack of laminated sheet materials comprising print 30, two-sided tape strips 80, and clear plastic support sheet 30 is set into the frame such that the stack rests upon the glass surface. The print and the tape strips are outside of this cutaway view, and their relative positions may be appreciated by particular reference to FIG. 12.

The four splines are loosely set into the rails. Mat board backer panel 40 is received by spline backer retention lips 260 Four splines, including two short splines 200A and two long splines 200B, are then pressed into place through the combined use of spline installation fixture 2000 and spline installation tool 3000, as described in subsequent FIGS. 17 through 25 inclusive. This process entraps both the laminated stack of display materials, and mat board backer panel 40.

Each hollow rectangular stub 410, formed integrally to each corner cap 400, fits into its respective corner insert 300 and attaches via the commensurate scale and positioning of internal snap fitting 340 and recessed detents 420. L-shaped retention wall 430 bears against mat board backer panel 40, and inhibits unwanted deflection of the fibrous panel. Internal cap face 440 bears against the splines and secures them against unintended withdrawal.

FIG. 15 is an illustration of metal hanger 500 having sawtooth plate 510. The structural features and the installation of the hanger may be more fully apprehended by reference to FIG. 1, to FIGS. 2 through 6 inclusive, and to FIG. 16. Metal hanger 500 is devised to clip onto any length of spline stock 200 by bridging spline backer retention lip 260 and angled spline lifting face 270. Channel 520 fits under spline backer retention lip 260. As the hanger is pressed into place, upper channel bead 530 rides over the rounded segment of spline lifting face 270, and snaps into a secure relationship with the installed spline. The tension securely retains the hanger in its lateral position. Sawtooth plate 510 provides plural positions for mounting upon a screw, nail, or hanger, so that any imbalance in the center of gravity of the frame may be practically addressed whenever the frame is mounted on the wall. The use of the hanger is elective, as the frame can stand alone, or electively be mounted on an easel, stand, or other supplementary display.

FIG. 16 shows the appearance of the back of print frame assembly 800 once its set of components is installed. Resilient bumpers 50 are introduced by hole bevel 460 into through-hole 450, so that the heads of the bumpers bear upon the external cap face 470. External cap face 470 covers any raw wood surfaces and any rough ends of the butted splines, and thereby imparts a neat, formal, and finished look to the back of the completed frame.

The frame assembly herein described may be appreciated as component in a comprehensive and versatile print display assembly system using common mechanisms to increase the speed and quality of the assembled kits. The broader invention may be apprehended to include compatible holding and insertion devices that can accommodate a modular range of kitted display materials.

Spline installation fixture 2000, illustrated in FIGS. 17 through 25 inclusive, may amenably and advantageously be employed with the print mounting system described in this application, while remaining compatible with previously disclosed embodiments of the comprehensive system of the invention.

Spline installation fixture 2000 is a tabletop assembly aid that includes four fences, each of which can be separately raised into a vertical position. The fixture is used to hold and secure a preassembled frame as splines are inserted into the frame. As this wedging action often requires considerable mechanical force to ensure secure assembly, the fixture also includes engagement features for a tool that imparts substantial force, without the noise, damage, or danger implicit in any impact tool.

Platen 2900 provides a flat base onto which a preassembled frame may be located for assembly in accordance with the invention. It may be made of metal, acrylic, styrene, polyvinyl chloride (PVC), polycarbonate, acrylonitrile butadiene styrene (ABS), phenolic, or other polymer or resin.

A tight fit with a full range of frame designs requires that the perimeter of the platen not be occupied by any hinge pin, pintle, or axle at the center of rotation of the displaceable fence. Accordingly, fixtures most suitable for use within the invention employ centerless hinges. The structure of a fence system combining a centerless hinge with a locking linkage is shown in the sectional views illustrated in FIGS. 17 through 20 inclusive.

FIG. 17 shows base extrusion 2100. FIG. 18 shows fence extrusion 2200.

FIG. 19 and FIG. 20 depict those two component, as well as two additional lengths of aluminum extrusion and two injection-molded polymer components, showing the set of parts assembled into a displaceable fence subassembly. FIG. 19 shows that raising the handle of linkage extrusion 2300 lowers the fence, while lowering the linkage extrusion raises the fence. Compatible imagery is shown in illustrations of the complete fixture shown in FIGS. 23, 24, and 25.

Returning now to FIG. 17, base extrusion 2100 includes base T-slot 2110, platen ledge 2120, centerless hinge hook 2130, and screw channels 2140. In FIG. 18, showing fence extrusion 2200, features of the extrusion include fence T-slot 2210, semicircular socket 2220, centerless hinge half-ring 2230, tool hook 2240, and fence bearing face 2250. Fence perpendicular extension 2260 geometrically connects tool hook 2240 and fence bearing face 2250

When base extrusion 2100 and fence extrusion 2200 are interlinked, as shown in FIG. 19 and FIG. 20, a centerless hinge is formed, and the parts allowed to be displaced into a perpendicular relationship without obstruction of the inner volume. FIG. 19 and FIG. 20 include further components which limit and activate the displaceable fence components.

Linkage extrusion 2300 includes linkage fence socket 2310, linkage beam 2320, linkage tie-bar socket 2330, and linkage handle 2340. Mounting extrusion 2400 includes C-shaped channel 2410 and mounting tie-bar socket 2120. Molded fence coupling 2500 includes fence-coupling T-fitting 2510 and coupling linkage axle 2520. Molded tie-bar 2600 includes tie-bar axles 2610 and 2620. Base extrusion 2100 and fence extrusion 2200 are moveably interlinked. Molded fence coupling 2500 links fence extrusion moveably to linkage extrusion 2200. Linkage extrusion 2300 is connected to mounting extrusion via molded tie-bar 2600.

As may be appreciated by the drawings, each of the four rotational features in the linkage can move freely, but only over designated angular range. The illustrated configuration provides bi-stable operation, namely, the fence naturally locks in a secure position at each extent of the allowed angular range. This property allows hands-free operation, and prohibits premature displacement of the fences as force is applied to install the splines into the frame.

The linear aluminum extrusions are laid upon molded positioning ledge 2710 of quarter-round base component 2700 and joined to the molded base part using screw channels 2140. Screws are fitted through pilot holes 2720 and tapped into screw channels 2140 formed integrally with base extrusion 2100. Screw retention fins 2730 deter screws from lifting from their designated slots.

Clip depression 2740 is dimensioned to receive tool holder 2810. Tool holder 2810 is amenably made of plated spring steel, and is fixed in place by the collaborative action of tool holder screw 2820 and the conformal contours of clip depression 2740. Base concavity allows room for the knob on spline insertion tool 3000, shown in detail in FIG. 22. Angled pin mounting 2760 is formed in the base such that, at each corner, threaded pin 2830 may be located in its associated mounting, and its extension from the mounting feature independently adjusted.

The mounting pin may be used to position a protective fabric liner within the fixture. As noted previously, spline installation fixture 2000 is devised to be useful in aspects of the larger invention, including the general tensioning of splines. The operation of prior embodiments of the invention, while analogous to those in the print-mounting system herein detailed, include variations of the invention in which splines entrap and tension printed fabric. The inclusion of these alignment and mounting pins allows the implementation and distribution of a universal fixture that can be used compatibly with a wide range of frames within the larger graphic arts system.

Briefly, in the fabric-tensioning application, a piece of fabric is trimmed to an irregular octagon, punched in four locations along the four short sides of the octagon, and mounted via the four holes onto the angled pins. The holes may be precisely and repeatably located through the use of a punch having a tray attached to the platen side of the punch. The tray has a raised, integrally molded fence including one sides conformal to full length of the short side, and two angled stops conformal to abbreviated sections of the long sides, such that the fabric may be laid at a consistent location in the tray, and the fabric pierced by the punch at a predetermined location. In accordance with prior application of the invention, these four holes may be placed over threaded pins 2830.

With these diverse applications of the invention in mind, the operation of spline installation fixture 2000 may be more thoroughly understood by reference to the design of the tool shown in FIG. 22, and sequence of actions illustrated in FIGS. 23 through 25, inclusive.

Spline installation tool 3000 includes toolhead 3100. The toolhead may be made out of cast, machined, or extruded aluminum, but may also be made of other metals, or any suitably hard plastic. Tool shaft 3010 may be machined from bar stock, and is threaded at each end. Spherical tool knob 3020 prevents slippage as manual force is applied to the tool.

The toolhead has two critical faces that transmit manual force imparted by the operator via the tool handle. Toolhead linear pivot 3110 allows the tool to freely and slideably engaged with tool hook 2240. Rotation of the toolhead within the constraint of tool hook 2240 imparts a progressive application of force upon a compatibly-dimensioned frame-and-spline system, such as the ones described in this and previously referenced applications.

Toolhead bearing face 3120 is devised to anticipate the progressive insertion of the spline into the rail. Accordingly, the requisite force and the location, in three dimensions, of the line of contact, may vary over the stroke of the tool. The profile of the bearing face will typically depart from a simple radius, and more commonly may be devised to have an elliptical, parabolic, hyperbolic, involute, or cycloidal profile.

Spline installation fixture 2000 is shown assembled with the fences in their lowered position in FIG. 23. While the four molded quarter-round base components 2700 are identical, only one is provided with tool holder 2810. The tool holder is used to prevent misplacement of spline installation tool 3000 when the fixture is not in use. In this figure, all four linkage extrusions 2300 are in their raised position, placing the fences in their lowered position, and yielding a hopper-like shape. In this position, the fixture can receive and position a preassembled frame.

Pressing down on the elevated linkage extrusions induces the fences to obtain their raised position. Fence perpendicular extensions 2260 entrap the preassembled frame (for clarity of detail, not shown in FIGS. 23 through 25). At this point, the splines are loosely inserted into the rails, toolhead linear pivot 3110 slidably engaged with tool hook 2240, and the tool handle rotated downward so that toolhead bearing face 3120 presses upon the splines until the relative position of the splines and rails approximates that shown in FIG. 6. As may be appreciated by reference to spline installation tool 3000 can be repositioned along each fence and pressure applied to the splines until they are substantially flush with the back of the rails.

This fixture may be used compatibly with the shadowbox-mounted print frame design described in this specification. It is also compatible with frames in which fabric is tensioned over the rails of the preassembled frame by the action of the splines. In this case, a perforation in a fold of fabric is located over the four angled, adjustable pins, and fence perpendicular extensions 2260 assist in the folding of the fabric. The splines are then inserted using the fixture and the compatibly designed tool, the frame removed, and the corner pleats turned into the mitered corners using any thin device such as a card or blade, as described in prior embodiments.

Synthetic, polymer, composite, or metal materials may be substituted for the milled wood stock illustrated in the figures, without departing from the invention. Treatments such as aerosols, surface texturing, spacers, deglossers, powders, such as talc or cornstarch, static removers or promoters, are all envisioned within the invention, and various implementations, modifications, and refinements of the invention are envisioned.

In the version of the invention illustrated in FIG. 1, and subsequent depictions of the invention within this specification, it may be appreciated that the completed frame provides a neat and consistent finish, whether viewed from the front or back, that the rails and splines can be made to match perfectly through the application of a conformal covering, that the assembly can be quickly and reliably achieved through the use of compatible alignment and assembly fixtures, that the assembly system is fully reversible, and thereby reduces both material waste and labor, that two differing colors or patterns can be included on the mat board backer, that a print, or a set of prints, can be mounted, in diverse and pleasing ways, using one integrated system, and that the final product can be provided to the end-user in a dependable and attractive package.

It is to be understood that like numerals in the drawings represent like elements through the several figures, and that not all components and/or steps described and illustrated with reference to the figures are required for all embodiments or arrangements.

Thus, illustrative embodiments and arrangements of the present devices and methods provide a method for applying a hair fastener. The flowchart in the figures illustrates the operation of possible implementations of methods according to various embodiments and arrangements. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A frame assembly comprising:
a mitered frame base including a plurality of rail sections that are joined together in corners of the mitered frame base by a plurality of fasteners, wherein each rail section includes a planar landing, each fastener being installed into the landings of adjacent rail sections that define one of the corners, each rail section including a first surface for receiving a glass plate and a print, each rail section including an inwardly facing retainer lip;
a plurality of splines that are configured to snap-fittingly mate with the plurality of rail sections, each spline having a second surface that faces the first surface of one of the respective rail sections for securing the glass plate and print between the spline and the rail section; and
a plurality of corner inserts that are configured to snap-fittingly mate with the plurality of rail sections, each corner insert having a plurality of outwardly directed beveled tabs which engage the retainer lips of corresponding rails sections for coupling the corners inserts to the rail sections.

2. The frame assembly of claim 1, wherein each rail section includes a dado formed therein and each corner insert includes an L-shaped connection ridge that is received within one dado of one rail section and within one dado of an adjacent rail section that defines one of the corners.

3. The frame assembly of claim 1, wherein each corner insert has a hollow interior and includes a plurality of locking tabs formed along inner surfaces thereof.

4. The frame assembly of claim 3, wherein each corner insert has a slot formed in one corner thereof to permit flexing of two side walls the slot.

5. The frame assembly of claim 3, further including a plurality of corner caps that are configured to mate with the plurality of corner inserts, each corner cap having an outwardly projecting protrusion that is received with the hollow interior of one corner insert, the protrusion having a plurality of openings formed in side walls thereof which receive the locking tabs of the one corner insert resulting in the corner cap snap-fittingly mating with the one corner insert.

6. The frame assembly of claim 5, wherein each corner cap includes a planar base from which the protrusion extends outwardly from a first face thereof, the planar base also include an L-shaped retention wall formed along a peripheral edge thereof and also extending outwardly from the first face.

7. The frame assembly of claim 6, wherein each of the protrusion of the corner cap and each of the corner inserts has a polygonal shape.

8. The frame assembly of claim 5, wherein the planar base includes an opening formed therethrough, the opening forming an entrance into a hollow interior of the protrusion.

9. The frame assembly of claim 8, further including a plurality of bumpers, each bumper being received within the opening of one of the corner caps.

10. The frame assembly of claim 1, wherein the plurality of fasteners comprises V-nails.

11. The frame assembly of claim 1, wherein each corner insert is disposed over one fastener.

12. The frame assembly of claim 6, wherein each spline includes a recess configured to receive a backer panel and when each corner cap mates with one corresponding corner insert, the retaining wall is positioned so as to entrap the backer panel.

13. The frame assembly of claim 1, further including a hanger that is secured within a groove formed in one of the splines.

14. A frame assembly comprising:
a mitered frame base including a plurality of rail sections that are joined together in corners of the mitered frame base, wherein each rail section includes a first planar landing, each rail section including a first surface and an inwardly facing retainer lip; and
a plurality of splines that are configured to snap-fittingly mate with the plurality of rail sections, each spline having a second surface that faces and is spaced from the first surface of one of the respective rail sections to define a space therebetween for securing an object between the spline and the rail section, each spline further including a second planar landing that seats against the first planar landing when the spline snap-fittingly mates with the respective rail section, the spline further including an engagement ridge that engages the inwardly facing retainer lip;

wherein the first planar landing is located between the inwardly facing retainer lip and the first surface, the second planar landing being located between engagement ridge and the second surface.

15. The frame assembly of claim 14, further including:
a plurality of corner inserts that are configured to snap-fittingly mate with the plurality of rail sections, each corner insert having a plurality of outwardly directed beveled tabs which engage the retainer lips of corresponding rails sections for coupling the corners inserts to the rail sections.

16. The frame assembly of claim 15, wherein each rail section includes a dado formed therein and each corner insert includes an L-shaped connection ridge that is received within one dado of one rail section and within one dado of an adjacent rail section that defines one of the corners.

17. The frame assembly of claim 15, wherein each corner insert has a hollow interior and includes a plurality of locking tabs formed along inner surfaces of the corner insert.

18. The frame assembly of claim 17, wherein each corner insert has a slot formed in one corner thereof to permit flexing of two side walls of the corner insert that define one corner thereof.

19. The frame assembly of claim 17, further including a plurality of corner caps that are configured to mate with the plurality of corner inserts, each corner cap having an outwardly projecting protrusion that is received with the hollow interior of one corner insert, the protrusion having a plurality of openings formed in side walls thereof which receive the locking tabs of the one corner insert resulting in the corner cap snap-fittingly mating with the one corner insert.

20. The frame assembly of claim 19, wherein the corner cap includes an internal face that overlaps two splines of the plurality of splines that meet in one corner.

21. A frame assembly comprising:
a mitered frame base including a plurality of rail sections that are joined together in corners of the mitered frame base; and
a plurality of splines that are configured to snap-fittingly mate with the plurality of rail sections and define an open space between first surfaces of the rail sections and second surfaces of the splines;
a plurality of corner inserts that are configured to snap-fittingly mate with the plurality of rail sections; and
a plurality of corner caps that are configured to mate with the plurality of corner inserts, each corner cap having an internal face that overlaps two splines that meet in one corner of the frame assembly.

22. The frame assembly of claim 21, wherein an underside of each corner cap includes an L-shaped retention wall that is formed along a peripheral edge of the corner cap and is configured to seat against a matt board for placement in a second space that is spaced from first space.

23. The frame assembly of claim 21, wherein the underside of the corner cap includes a hollow stub that is received within a hollow interior of one respective corner insert.

24. The frame assembly of claim 23, wherein the hollow interior of the corner insert includes first locking elements that mate with second locking elements formed on the hollow stub for snap-fittingly attaching the corner cap to the corner insert, the hollow stub further including third locking elements for snap-fittingly mating with the plurality of rail sections.

* * * * *